April 27, 1965 T. R. PRYDE 3,180,670

CHASSIS PULLING TOOL

Filed July 22, 1963 2 Sheets-Sheet 1

THOMAS R. PRYDE

*INVENTOR.*

*BY*

*ATTORNEYS*

April 27, 1965 T. R. PRYDE 3,180,670

CHASSIS PULLING TOOL

Filed July 22, 1963 2 Sheets-Sheet 2

THOMAS R. PRYDE

INVENTOR.

BY

ATTORNEYS

United States Patent Office 3,180,670
Patented Apr. 27, 1965

3,180,670
CHASSIS PULLING TOOL

Thomas R. Pryde, Philipsburg, Pa., assignor, by mesne assignments, to the United States of America as represented by the Secretary of the Navy Filed July 22, 1963, Ser. No. 296,875
1 Claim. (Cl. 294—15)

This invention relates to extracting tools and in particular to chassis pulling tools.

Much of today's large electronic equipment is packaged in such a way that it can be repaired or replaced easily. That is, electronic units are made up of sub-assemblies or chassis which are mounted in racks or cabinets. Usually, these sub-assemblies slide into and out of such racks in grooves or ways. These sub-assemblies commonly are interconnected by mean of plugs mounted on these chassis which fit into receptacles rigidly fixed within the rack. By virtue of the fact that a good electrical connection between the plug and receptacle is an absolute necessity, the receptacle must grip the plug exceedingly tight. Heretofore, this presented a problem when one wished to remove a chassis from a rack. Since separating the plug and receptacle causes the most problem, it can be seen that the chassis must be withdrawn only a short distance to loosen it from the rack. Thereafter, the chassis usually slides easily out of the rack.

Current methods of removing chassis from racks involve merely pulling or yanking on the chassis or a handle attached thereto. Many times the components or circuitry mounted on the chassis are damaged when the plug and receptacle separate abruptly. Personal injury and injury to persons nearby has been known to occur when, while attempting to remove a chassis, it was thrown some distance when it came free of the rack. The invention hereinafter described solves these problems by providing a device which will allow the pulling force applied to the chassis to be carefully controlled.

Therefore, it is the primary object of this invention to provide a tool which permits the operator to withdraw a chassis from a rack with controlled force.

Another object of this invention is to eliminate the possibility of causing damage to delicate components mounted on a chassis, while the chassis is being removed from a rack.

A further object of the invention is to protect persons from injury when they are attempting to remove a chassis from a rack.

These and other objects and a fuller understanding of the invention will be had by referring now to the following description and claims taken in conjunction with the accompanying drawings in which:

Figure 1:
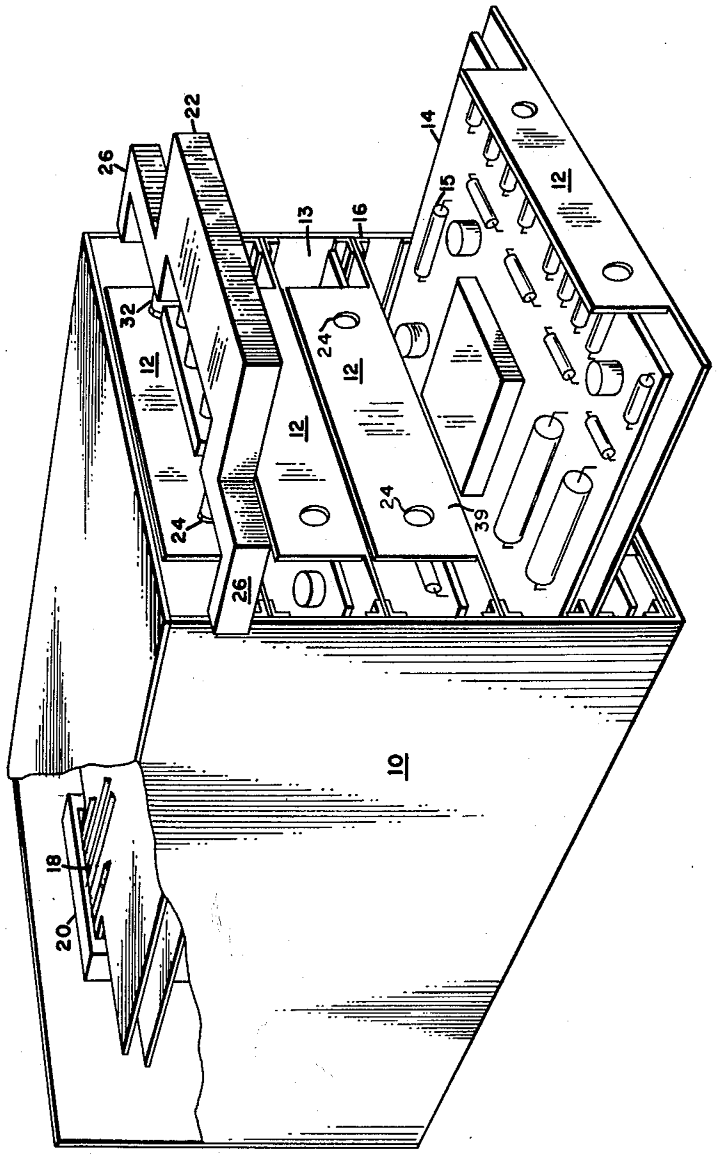
FIGURE 1 shows a three-dimensional view of a rack with chassis mounted therein and this invention in its operating position.

Referring now to FIG. 1, there is shown rack 10 adapted to contain a number of drawer-like chassis or trays 12 with one chassis partially removed. These chassis 12, upon which are mounted numerous electronic components 15, often on a printed circuit board 14, are slideably positioned within rack 10 so that they may be inserted and removed from the front face 13. Removal is normally effected by hooking the ends of the index fingers of an operator through a pair of holes 24 and pulling on a chassis. Each chassis 12 is supported within rack 10 by means of guides 16. Plug 18, electrically connected to components 15, is mounted on the rear portion of chassis 12. Aligned with plug 18 is a receptacle 20 mounted on the rear wall of rack 10. When chassis 12 is fully inserted into rack 10, plug 18 is inserted in receptacle 20 such that the electronic components on printed circuit board 14 are connected with other units [not shown] in the system. Thus, as each chassis 12 is inserted into rack 10, plug 18 is inserted in receptacle 20 and as the chassis 12 is withdrawn from rack 10 the connection is broken. In order to assure that the electrical connection between plug 18 and receptacle 20 is not loosened by vibration and the like, plug 18 is gripped exceedingly tight by receptacle 20 and consequently much force is required to make and break the connection. The chassis pulling tool 22 is shown in its operating position with extractor bars 32 engaged in holes 24 of chassis 12 and legs 26 bearing against the front portion of rack 10.

Figure 2:
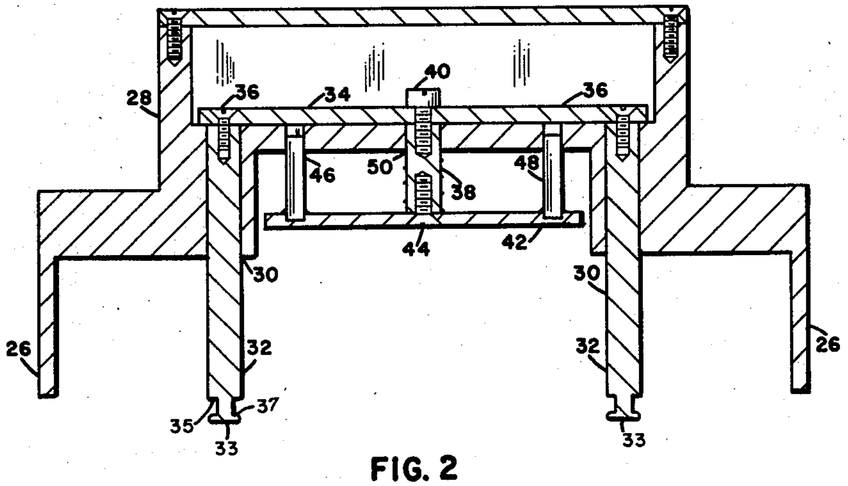
FIGURE 2 shows a section view of the preferred embodiment of the invention.

Referring now to FIG. 2, there is shown a body 28 as being substantially rectangular in shape and having two legs 26 which project from opposite sides in a common direction. Extractor bars 32, each having a notch at one end which is adapted to engage a chassis, are slideably positioned within body 28 such that the notched ends extend from within through holes 30 in the edge of body 28 in the direction of the legs. The other ends of extractor bars 32 are located in the interior cavity of body 28 and are fastened, one to each end of connecting rod 34, by means of screws 36. In the middle portion of connecting rod 34 is fastened pressure pin 38 by means of screw 40. Pressure pin 38 although shorter in length than extractor bars 32, extends in the same direction as extractor bars 32. Pressure plate 42, fastened in the center portion to pressure pin 38 by means of screw 44, is positioned in the same plane as and between extractor bars 32. Guide pins 46 and 48 are screwably attached to pressure plate 42, one on each side of pressure pin 38. Biasing spring 50 encircles pressure pin 38 between body 28 and pressure plate 42 so as to cause pressure plate 42 to be biased away from body 28.

In operation, circular heads 33 on extractor bars 32 are inserted axially through holes 24 until limited by annular abutments 35. The tool is then shifted laterally a slight distance, causing a portion of annular surface 37 on each head 33 to engage the inner surface of sheet material 39, adjacent holes 24, thus hooking the bars to a chassis in a manner similar to the hooking of the ends of index fingers of an operator, previously referred to. The legs 26 of body 28 are made to bear on rack 10. The tool 22 is operated by gripping with the hand, the body 28 and pressure plate 42, such that the palm is against the body 28 and the fingers bear on the pressure plate 42. Simply by squeezing the two together, the connection between the plug 18 and the receptacle 20 is broken and the chassis easily removed from the rack.

Figure 3:
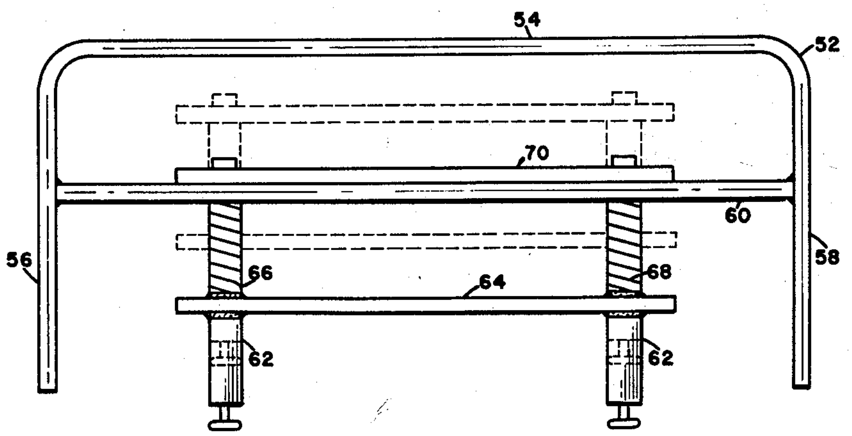
FIGURE 3 is a side view of an alternate embodiment of this invention.

With reference to FIG. 3, frame 52, fashioned generally in the shape of a rectangle with base 54 and sides 56 and 58. Crossmember 60 is welded to the midportion of sides 56 and 58. Extractor bars 62, similar to those in FIG. 2, are notched at the end portion to engage or attach to holes 24 in chassis 12. In addition, extractor bars 62 are slideably attached to crossmember 60 at the end opposite the notches. Pressure plate 64 is fastened to extractor bars 62 such that it is between the crossmember and the open end of the frame 52, and so that it is substantially parallel to crossmember 60. Biasing springs 66 and 68 encircle extractor bars 62 between crossmember 60 and pressure plate 64 so as to bias pressure plate 40 away from cross-member 54. Connecting rod 70 joins extractor bars and serves to make the slideable assembly rigid. The dotted outline shows the slideable relationship between sides 56 and 58 and extractor bars 62.

The operation of this embodiment would be similar to that of FIG. 2 in that sides 56 and 58 would bear against rack 10 and extractor bars 62 would engage chassis 12. Hand pressure is then applied and the chassis is safely and easily disconnected from the rack.

Although the invention has been described with a certain degree of particularity, it is understood that the present disclosure has been made only by way of example and that numerous changes in the details of construction and the combination and arrangement of parts may be resorted to without departing from the spirit and scope of this invention as hereinafter claimed.

I claim:

A device for use with a cabinet of the type having a plurality of parallel stacked rectangular slideable trays, each having electronic components secured thereto, the electronic components of each tray being connected to components of other trays by a detachable plug and socket disposed adjacent the rear edges of the trays, each tray having a front face of sheet material disposed perpendicular to the plane of a tray with a pair of spaced circular holes extending through said face for normally receiving the fingers of an operator, for slideably removing a tray, said cabinet having a pair of marginal edges, each disposed in substantially the same plane as the plane of the tray faces, one adjacent each lateral edge of a tray face, said front faces substantially closing the front face of the cabinet, like the drawers of a conventional cabinet, said device adapted to remove each tray when the frictional force between a plug and socket exceeds the force which can be easily applied by said fingers, said device, comprising;

(*a*) a first U-shaped member, the ends of the legs of which are adapted to engage the marginal edges of a cabinet, (*b*) a pair of spaced parallel guide pins slideably received by the bight of said U-shaped member, and connected for conjoint slideable movement by an elongated finger grasping member disposed parallel to the bight, (*c*) a second U-shaped member having its legs secured to the first U-shaped member, its bight portion being disposed parallel and spaced from the bight of the first named U-shaped member and forming an abutment for the palm of a hand, (*d*) each pin having a circular head on an end thereof of a size to extend through one of the circular holes in the front face of a slidable tray and having an annular surface for abutting the reverse side of the front face of a tray adjacent any portion of the periphery of a hole therein, whereby the pins are rendered attachable to the front face of a tray by lateral movement in any direction after the heads are inserted into the holes, (*e*) and an annular abutment on each pin, spaced from its head a distance slightly in excess of the thickness of the front face of a tray, for limiting the extent of insertion of a pin into a hole.

References Cited by the Examiner

FOREIGN PATENTS 837,380 6/60 Great Britain.

SAMUEL F. COLEMAN, *Primary Examiner.*

ERNEST A. FALLER, Jr., *Examiner.*